Sept. 20, 1932.   R. P. YOUNG   1,878,567
HANDLE FOR WOODEN BASKETS
Filed Dec. 28, 1928
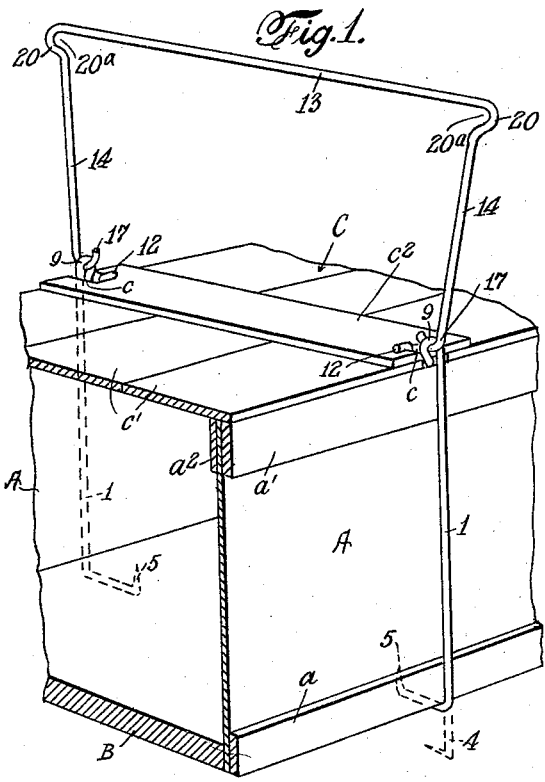
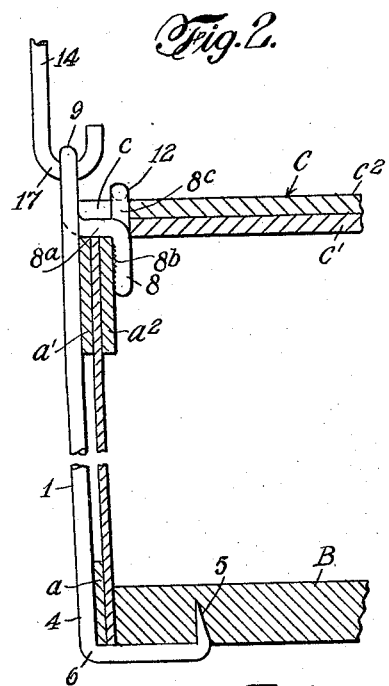
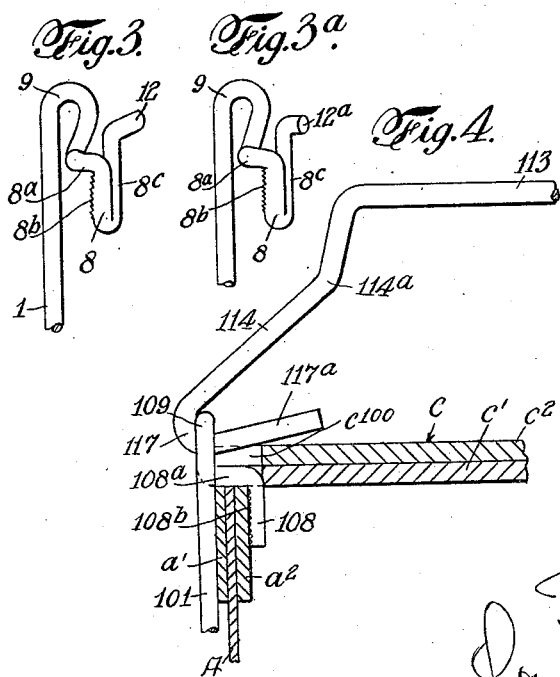
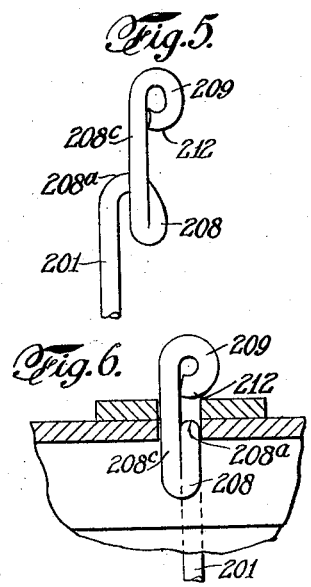
INVENTOR
Ralph P. Young
BY
Louis Prevost Whitaker
ATTORNEY Patented Sept. 20, 1932

1,878,567

UNITED STATES PATENT OFFICE

RALPH P. YOUNG, OF MARLBORO, NEW YORK

HANDLE FOR WOODEN BASKETS

Application filed December 28, 1928. Serial No. 328,940.

My invention consists in the novel features hereinafter described, reference being had to the accompanying drawing, which shows certain forms in which I have contemplated embodying my invention, selected by me for purposes of illustration, and the said invention is fully disclosed in the following description and claims.

The object of my invention is to provide a metallic handle for wooden baskets of the kind ordinarily used for holding and transporting grapes and other fruits, vegetables, etc., and is an improvement on certain of the handles set forth in my copending application for Letters Patent of the United States Serial No. 185,960, filed April 23, 1927. My present invention consists of certain novel constructions and combination of parts whereby the handle can be more readily attached to the baskets and used therewith, with special reference to the assembly of the handle, the locking of the cover of a basket in position, and economy of space in storing or shipping after the handles have been assembled.

Referring to the accompanying drawing,

Fig. 1 represents a perspective view, partly in section, of a portion of a basket showing the preferred form of handle attached thereto in operative position and holding the cover against accidental displacement.

Fig. 2 is a fragmentary sectional view on a larger scale, illustrating the connection of a side piece of the handle with one side of a basket and with a basket cover in closed position.

Fig. 3 is a perspective view of the upper end of one of the side pieces.

Fig. 3a is a similar view of a slight modification.

Fig. 4 is a view similar to the upper part of Fig. 2, illustrating a modified form of handle.

Fig. 5 is a detail sectional elevation showing the upper part of another modified form of side piece and adjacent parts of the basket and cover.

Fig. 6 is a fragmentary section showing the parts illustrated in Fig. 5, in their relations to the basket and cover.

The wooden baskets for which my improved handle is intended, are manufactured commercially at factories located at various points more or less remote from the points where the baskets are packed and shipped. The handles, which are preferably formed of metal wire and of iron or steel, comprise in each case, three members, two side members adapted to be permanently secured to the sides of the basket and midway between the ends thereof, and a detachable bail member which, according to the present invention, may be swung down from its upright position. Preferably the side members are permanently attached to the baskets before shipment. As the bail members are made separately from the side members, or pieces, the baskets, after the adjustment of the side members, may be nested and shipped to the consumer with a suitable number of bail members and lids or covers. Under ordinary circumstances the bail members are attached to the already attached side members to complete the handles, so that they may be used to support the basket while they are being filled. After the baskets are packed or filled, covers or lids are placed in closed position thereon to protect the contents, and the baskets are in condition for shipment. It will be seen that storage and shipping will be facilitated by use of handles constructed according to the present invention inasmuch as the bails may be turned down and the filled baskets may be piled or arranged much more compactly than would otherwise be possible. Each handle, as hereinafter described, enters recesses in the cover at opposite sides thereof, to prevent longitudinal movement of the cover, and also engages the cover from above to hold it on the basket.

It is found in practice that these baskets, which usually comprise a solid wooden bottom, indicated at B, vertically disposed side pieces or members, indicated at A, and binding strips of wood veneer, illustrated at a, a' and a² (see Fig. 1), vary materially as to the vertical height of the sides, due at least in part to variations in the thickness of the material of which the bottom, B, is formed, this variation being sometimes as great as from one eighth of an inch to one half an inch, and as the cover retaining shoulder of each side piece must extend inwardly at substantially exactly the proper distance above the upper edge of the basket side to accommodate the cover, indicated at C in Fig. 1, and shown as including longitudinal strips, c', and a central transverse strip or cleat, c², and as it is desirable that the side pieces shall extend to or beneath the bottom of the basket and be secured thereto in order that the weight of the basket and contents be transmitted from the bottom of the basket directly to the handle when the basket is supported thereby, it is particularly desirable to provide a form of side piece having means for properly positioning the upper end thereof with reference to the top of the basket, and also means for accommodating such variations in the height of the basket sides, for without such accommodation it would be necessary to make side pieces in a variety of lengths and the cost of production would be greatly increased.

In carrying out my invention as illustrated in Figs. 1, 2 and 3, I form the side member, indicated at 1, preferably of round wire and having at its lower end a portion, 4, suitable to be bent readily and terminated by an impaling point, 5. The side member, 1, is constructed to extend slightly above the top of the basket, and is bent sharply at the outside of the basket upon itself, to form the holding loop, 9, and has a portion extending inwardly from the lower side of the holding loop and substantially perpendicular to the main portion of the side piece and forming a shoulder, 8a, to engage the upper edge of the side of the basket, A. The stock is then bent sharply downwardly to form a clamping portion, substantially parallel to the main portion of the side piece and spaced therefrom sufficiently to receive and clamp the side member on the side of the basket, the portion, 8, being preferably roughened, as at 8b, where it engages the side of the basket. The stock of the side member is then bent sharply back and upwardly from the portion, 8, as indicated at 8c, to lie along the portion 8, and engage the side of the basket, thus providing a better bearing for the clip formed by the portion, 8, and the adjacent part of the main portion of the side piece.

The portion, 8c, extends upwardly through a recess at the edge of the cover to hold the latter against longitudinal movement, and the stock is then bent into horizontal position, to form the shoulder, 12, in proper position to engage the cover, C, and hold it down on the basket. This portion, C, is preferably bent in such a direction that it will extend longitudinally of the basket so that it will not project inwardly beyond the inner side of the part, 8c, as shown in Figs. 1, 2 and 3. This is desirable because it does not offer any inwardly extending projections to interfere with nesting the baskets. I wish it to be understood, however, that the part referred to may be bent inwardly if desired, is indicated in Fig. 3a, at 12a, for example, so as to project over the inner end of the slot in the cover instead of the side of the slot, should this construction be found desirable for any reason.

In attaching the side piece, it is pressed into firm engagement with the top edge of the basket, while the portion, 4, at the lower end of the side piece extends below the bottom, as indicated in Fig. 1, and then the bend, 6, is made at the proper point in the portion, 4, the stock of the side pieces being sufficiently soft to permit them to be bent around the bottom edge of the particular basket to which they are attached, thus accommodating variations in the height of the basket side and the impaling point, 5, is secured to the bottom, B.

It will be understood that each basket is provided with two of these side pieces, and the handle is completed by a bail member having a hand engaging portion, 13, and downwardly extending arms, 14, 14, which are provided at their lower ends with inter-engaging portions, preferably in the form of hooks, 17, 17, which are made to engage with the loops, 9, 9, of the side pieces. As the bail member is usually attached to the side members and basket at the time the basket is to be filled and before the cover is applied, I prefer to form the bail member with outwardly extending bends or loop portions, indicated at 20, in Fig. 1, so as to make the bail member wider at the upper portion adjacent to the hand engaging member, 13. This forms a recess, 20a, at each side of the bail to receive one edge of the cover, C, when the cover is to be inserted, the other edge being beneath the shoulder, 12, at the opposite side of the basket, so that the cover can be slid longitudinally through the bail without engaging the contents of the basket, until it is in the proper position longitudinally thereof, when the raised edge can be forced down beneath the shoulder, 12, of the side piece on the adjacent side of the basket, by slightly springing the cover, the shoulder, 12, preferably engaging the top of the cover at the edges of notches or recesses, c, in the cover, to prevent the cover from moving vertically. The upwardly extending portions, 8c, of the side pieces extend through the notches in the cover, and the horizontal portions, 8a, also lie in these notches, thus holding the cover against movement longitudinally of the basket. It will be seen that in this form of handle the bail member may be swung downwardly toward the cover, thus facilitating economy of space in storage. Obviously, the longitudinal slats, c', may be replaced by a single member, for example, one of wood veneer.

In Fig. 4 I have shown a modification of the handle, in which the corresponding reference numerals are used, with the addition of 100 to avoid repetition. In this construction, the side member, 101, has its lower end (not shown) the same form as the side piece illustrated in Fig. 1, but at its upper end extends slightly above the top of the basket, and is bent sharply downwardly upon itself in a plane parallel to the side of the basket to form the holding loop, 109, and has a portion extending inwardly from the lower side of the holding loop and substantially perpendicular to the main portion of the side piece and forming a shoulder, 108a, to engage the upper edge of the side of the basket, A, and to enter a recess or notch, $c^{100}$, at the edge of the cover and act to hold the cover against longitudinal movement. The side piece, 101, also has a clamping portion, 108, having a roughened surface, 108b, and corresponding to portion, 8, in Fig. 1. In this form of side piece, there is not, however, any extension up through the cover nor any cover locking shoulder.

Each basket, of course, is provided with two of these side pieces or members, 101, and the handle is completed by a bail member having a hand engaging portion, 113, and downwardly diverging arms, 114, 114, which are provided with interengaging portions, preferably in the form of hooks, 117, 117, which are made to engage with the loops, 109, 109, of the side pieces, and of which the ends, 117a, 117a, engage in recesses, $c^{100}$, $c^{100}$, at the edges of the cover, C', to prevent longitudinal movement thereof, and engage the cover from above at the inner ends of the notches to hold it down. Preferably, these notches extend through the cover, and also in the ends of the cross cleat, $c^{102}$, and preferably engage the horizontal portion, $108^{a}$, so as to prevent longitudinal movement of the cover. Preferably, the arms of the bail are bent outwardly at $114^{a}$, to enable, among other advantageous features, the use of a longer hand engaging portion, 113, while permitting the lower parts of the arms to extend in the desired directions.

In Figs. 5 and 6, I have shown another slight modification of my invention, in which the corresponding parts are given the same numerals with the addition of 200. In this form, the upper end of the side member, 201, is given a bend, at 208a, fitting over the top of the basket edge, and has a part, 208, extending downwardly, and is then bent back upon itself, and is provided with a vertical portion, 208c, lying alongside of the part, 208, and extending above the position of the cover, where it is provided with a terminal loop, 209, to receive the bail. This loop extends preferably longitudinally of the basket, so as not to interfere with nesting. The lower outer surface of this loop, indicated at 212, will therefore rest upon the top surface of the cover, and hold it down upon the basket, while the portion of the part, 208c, adjacent to the loop, 209, and between it and the bend, 208a, will lie in the slot in the cover and hold the cover against longitudinal movement. The bail for use with side pieces of the kind described in Figs. 5 and 6, may be of any desired form, but will preferably be of the general type shown in Figs. 1 and 2, for example. It will be noted that in this case the bail engaging loop, indicated at 209, is situated in line with the inner side of the basket wall or edge instead of in line with the outer side, as indicated in Figs. 2 and 4, for example, and therefore, it will obviously be necessary to detach the bail in attaching or removing the cover.

The various embodiments of my improved handle herein shown and described, as will be seen, are extremely simple in construction and can be manufactured very cheaply and have at the same time many of the desirable features obtainable with much more expensive types of handle.

What I claim and desire to secure by Letters Patent is:—

1. A metallic handle for veneer baskets, including a pair of side pieces, each comprising a rod-like member, provided at its upper end with an integral clip for engaging the upper edge of the basket side, and an integral loop adjacent thereto having its lower portion in position to engage and retain the cover, each of said side pieces being provided at its lower end with means for attaching it to the bottom of the basket, and a bail member provided at each end with means for pivotally engaging the loops of said side pieces, and lying when in folded position in a plane substantially coincident with the top surface of the cover.

2. A metallic handle for veneer baskets including a pair of side pieces each comprising a rod like member, provided at its upper end with an integral clip for engaging the upper edge of the basket side, and an integral loop adjacent thereto, and disposed in a plane longitudinal with respect to the basket, and having the center of the loop closely adjacent to the plane of the top surface of the cover, each of said side pieces being provided at its lower end with means for attaching it to the bottom of the basket, and a bail member provided at each end with a hook portion disposed transversely with respect to the basket for engaging one of said loops, said hook portions extending inwardly into position to engage the cover and hold it from vertical movement, and said bail lying, when in folded position, wholly in a horizontal plane substantially coincident with the top surface of the cover.

In testimony whereof I affix my signature.

RALPH P. YOUNG.